United States Patent [19]
Segawa

[11] Patent Number: 5,909,881
[45] Date of Patent: Jun. 8, 1999

[54] COMPOSITION FOR SLIDING MEMBER AS WELL AS SLIDING MEMBER AND SPHERICAL ANNULAR SEAL MEMBER FORMED OF THE COMPOSITION

[75] Inventor: Takeo Segawa, Yamaguchi-ken, Japan

[73] Assignee: Oiles Corporation, Tokyo, Japan

[21] Appl. No.: 08/821,372

[22] Filed: Mar. 20, 1997

[30] Foreign Application Priority Data

Mar. 22, 1996 [JP] Japan ................................. 8-093358

[51] Int. Cl.[6] ........................... F16J 15/00; F16J 15/12
[52] U.S. Cl. ..................... 277/627; 277/592; 277/594; 277/938; 428/34.5; 523/149
[58] Field of Search ........................ 428/34.5; 277/100, 277/230, 592, 594, 627; 523/149

[56] References Cited

U.S. PATENT DOCUMENTS

| | | | |
|---|---|---|---|
| 4,554,084 | 11/1985 | Lonne et al. ............................ | 508/103 |
| 4,601,476 | 7/1986 | Usher et al. ............................. | 277/230 |
| 4,659,091 | 4/1987 | Baasner et al. ......................... | 428/34.5 |
| 4,762,330 | 8/1988 | Lonne et al. ............................ | 277/230 |
| 4,955,218 | 9/1990 | Brandener ................................ | 72/146 |
| 5,041,321 | 8/1991 | Bendig .................................... | 428/102 |
| 5,462,291 | 10/1995 | Maeda et al. ........................... | 277/100 |
| 5,616,406 | 4/1997 | Nakamaru et al. ..................... | 428/545 |

FOREIGN PATENT DOCUMENTS 4-77835  12/1992  Japan .

*Primary Examiner*—Tae Yoon
*Attorney, Agent, or Firm*—Nixon & Vanderhye P.C.

[57] ABSTRACT

A spherical annular seal member has a through hole in a central portion thereof and a partially convex spherical surface portion on an outer surface thereof, and is formed by compression molding a mixture consisting essentially of from 40 to 80% by weight of steel fibers or wool chops, from 3 to 20% by weight of a borosilicate glass powder, and from 15 to 50% by weight of a graphite powder.

12 Claims, 4 Drawing Sheets

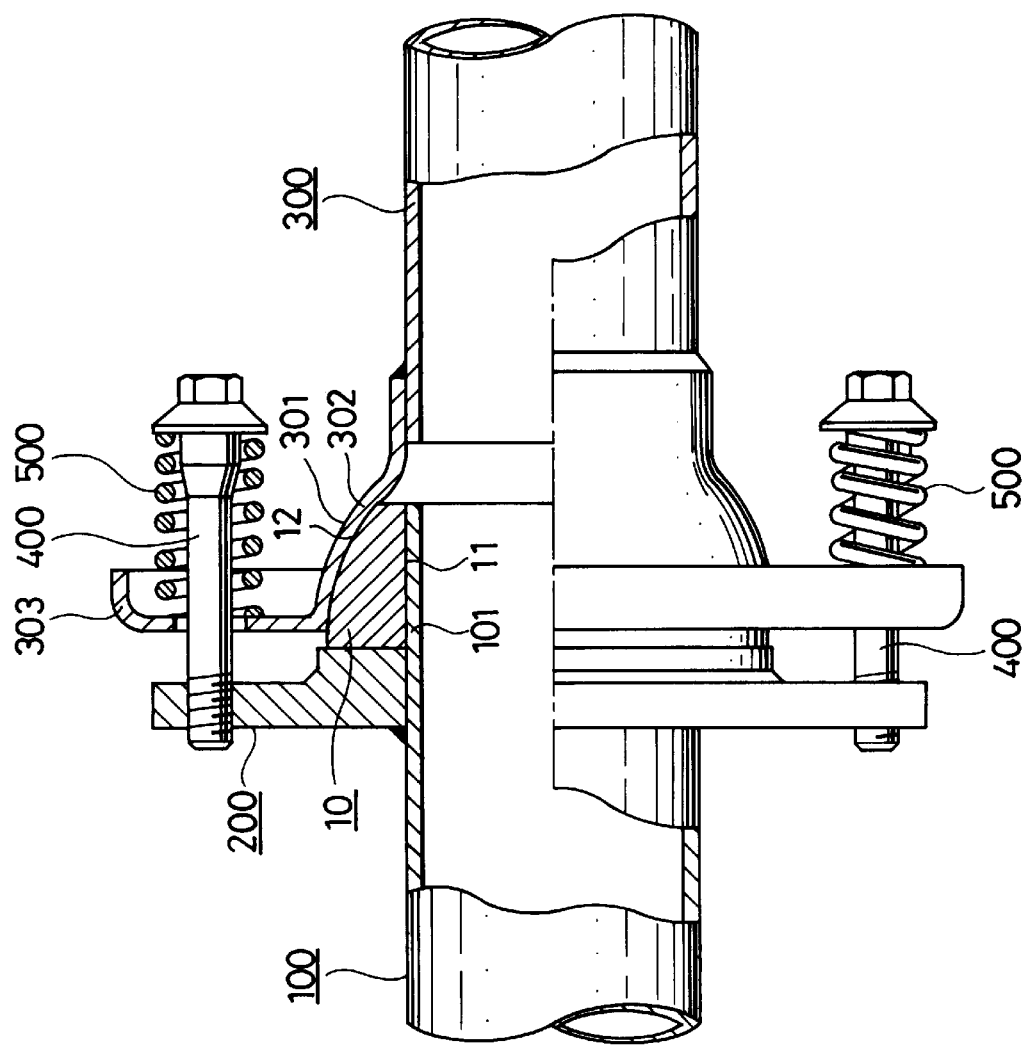

COMPOSITION FOR SLIDING MEMBER AS WELL AS SLIDING MEMBER AND SPHERICAL ANNULAR SEAL MEMBER FORMED OF THE COMPOSITION

BACKGROUND OF THE INVENTION

1. Field of the Invention

The present invention relates to a composition for a sliding member which is suitably used for a portion for which heat resistance is required, as well as a sliding member and a spherical annular seal member using the composition. In the present invention, the sliding members include, among others, bearing bushes and slide plates which are used in portions for receiving load in various machines and sliding in the same, as well as spherical annular seals which are used in, for instance, spherical joints of automobile exhaust pipes, for which a hermetically sealing function is required in addition to the function of receiving load and sliding.

2. Description of the Related Art

Conventionally, metal materials, nonmetal materials such as graphite or ceramics, compound material such as cermet, and heat-resistant plastic materials such as polytetrafluoroethylene (PTFE) and polyimide resins are known as materials of this type of sliding member. These materials are respectively heat resistant, but problems remain under dry frictional conditions in that the materials have a drawback in friction and wear, that there are shortcomings in their mechanical strength, particularly in impact strength, and that their affinity with mating members is not necessarily satisfactory.

To overcome these problems, as disclosed in U.S. Pat. No. 1,137,373 and Japanese Patent Application Publication No. 23966/1969, sliding members have been developed in which expanded graphite obtained by subjecting graphite to special treatment is formed together with reinforcing members such as metal fibers or the like. Although these sliding members are heat resistant and excel in their affinity with mating members, the sliding members have a drawback that they sometimes generate abnormal noise during sliding under dry frictional conditions.

In addition, although Japanese Patent Application Laid-Open No. 33267/1982 discloses a sliding member which is formed by press-forming a mixture of graphite and metal fibers, this sliding member has a drawback in that they also sometimes generate abnormal noise during sliding under dry frictional conditions.

SUMMARY OF THE INVENTION

In view of the above-described circumstances, it is an object of the present invention to provide a composition for a sliding member which is suitable for use under dry frictional conditions over a wide temperature range from the normal temperature to 600° C. and which excels in friction and wear characteristics and does not generate abnormal noise when it is used under the aforementioned conditions, as well as a sliding member and a spherical annular seal member using that composition.

As a result of conducting various studies to attain the above object, the present inventors discovered that a sliding member and a spherical annular seal member which are each constituted by compression moldings of a mixture of steel fibers or wool chops, borosilicate glass, and graphite, when used under dry frictional conditions, exhibit excellent frictional wear characteristics without generating abnormal frictional noise, and exhibit a hermetically sealing characteristic as well. The present invention has been completed on the basis of such a discovery, and the gist of the present invention is as follows.

In accordance with a first aspect of the present invention, there is provided a composition for a sliding member, comprising from 40 to 80% by weight of steel fibers or wool chops, from 3 to 20% by weight of a borosilicate glass powder, and from 15 to 50% by weight of a graphite powder.

Further, in accordance with a second aspect of the present invention, there is provided a sliding member obtained by compression molding into a desired shape a composition comprising from 40 to 80% by weight of steel fibers or wool chops, from 3 to 20% by weight of a borosilicate glass powder, and from 15 to 50% by weight of a graphite powder.

Further, in accordance with a third aspect of the present invention, there is provided a spherical annular seal member particularly for use in an exhaust pipe joint of a vehicle and having a through hole in a central portion thereof and a partially convex spherical surface portion on an outer surface thereof, the spherical annular seal member being formed by compression molding a mixture consisting essentially of from 40 to 80% by weight of steel fibers or wool chops, from 3 to 20% by weight of a borosilicate glass powder, and from 15 to 50% by weight of a graphite powder, or a spherical annular seal member particularly for use in an exhaust pipe joint of a vehicle and having a through hole in a central portion thereof and a partially convex spherical surface portion on an outer surface thereof, the spherical annular seal member comprising: a hollow cylindrical reinforcing member constituted by a metal mesh formed by being wound into a hollow cylindrical shape; and a mixture consisting essentially of from 40 to 80% by weight of steel fibers or wool chops, from 3 to 20% by weight of a borosilicate glass powder, and from 15 to 50% by weight of a graphite powder, wherein the mixture is filled in such a manner as to fill mesh openings of the hollow cylindrical reinforcing member and cover the hollow cylindrical reinforcing member, the hollow cylindrical reinforcing member and the mixture being formed structurally integrally by being compression molded.

In the present invention, as the steel fibers or wool chops, those having a diameter of 20 to 200 $\mu$m and a length of 100 $\mu$m to 10 mm are used. The steel fibers or wool chops mainly function as a reinforcing material, and are compounded with the composition in a proportion of from 40 to 80% by weight, preferably in a proportion of from 50 to 70% by weight. If the ratio is less than 40% by weight, the effect as the reinforcing material is insufficient, and cracking or deformation of the shape is liable to occur during use. On the other hand, if the ratio is more than 80% by weight, the proportion of the steel fibers or wool chops being exposed at the sliding surface increases, and the lubricating effect of graphite, which will be described later, is lowered.

In a sliding member or a seal member which is used in a high-temperature range, e.g., in a range of from 400 to 600° C., the borosilicate glass in the composition exhibits in itself the action of a lubricant and displays the action of preventing consumption of graphite due to oxidation at high temperatures. In addition, the borosilicate glass displays the action of increasing the binding force of the moldings (the sliding member or seal member) by virtue of the viscosity of the glass. Although this borosilicate glass is based on the three components of $SiO_2$-$B_2O_3$-$Na_2O$, it was confirmed in the present invention that the amount of $B_2O_3$ is preferably in the range of from 40 to 70% by weight. If the amount of $B_2O_3$ is less than 40% by weight, the softening point of the glass becomes excessively high, and the action of preventing the consumption of graphite due to oxidation at high temperatures decreases. On the other hand, if the amount of $B_2O_3$ is more than 70% by weight, the moisture absorption of the glass itself becomes high, so that a drawback occurs in handling. The amount of borosilicate glass contained in the composition is in the range of from 3 to 20% by weight, preferably from 5 to 15% by weight. If the amount of borosilicate glass is less than 3% by weight, the aforementioned effect is not sufficiently displayed, whereas if the amount of borosilicate glass is more than 20% by weight, the frictional performance declines, resulting in the generation of abnormal frictional noise.

The aforementioned steel fibers or wool chops and borosilicate glass are compounded with graphite constituting a principal component so as to form the composition for a sliding member. Graphite constituting the principal component is compounded with the composition in a proportion of from 15 to 50% by weight, preferably in a proportion of from 25 to 40% by weight. If the amount of graphite is less than 15% by weight, the lubricity is poor, abnormal frictional noise is liable to occur frequently when it slides with respect to its mating member, and its frictional surface becomes coarse. Therefore, in an application to a spherical annular seal member, in particular, there arises a drawback in that the amount of gas leakage increases. If the amount of graphite is more than 50% by weight, the strength of the moldings becomes insufficient.

In the composition for a sliding member in accordance with the present invention, as a phenolic resin, a metal fluoride, and a phosphate are further compounded at fixed proportions with the mixture of the steel fibers or wool chops, borosilicate glass, and graphite, it is possible to further improve the frictional wear characteristics, the action of preventing the generation of abnormal frictional noise, and the operational efficiency in manufacture.

The phenolic resin is compounded for the purpose of improving the operational efficiency in manufacture particularly when a sliding member or a seal member is formed by using the composition. That is, a phenolic resin dissolved in an alcohol solution is compounded with the mixture of the steel fibers or wool chops, borosilicate glass, and graphite, and is agitated and mixed, and the mixture is formed into a granulated powder. As the mixture is thus formed into the granulated powder, the fluidity of the mixture improves, and the handling efficiency is enhanced, thereby facilitating the charging of the mixture into a mold during the molding operation. The amount of compounding of the phenolic resin is preferably in a proportion of from 0.3 to 2% by weight with respect to the composition. If the amount of compounding of the phenolic resin is less than 0.3% by weight, the mixture cannot be formed into the granulated powder. Meanwhile, if the phenolic resin is compounded in excess of 2% by weight, an increase in the effect of granulation of the mixture cannot be expected and, on the contrary, it causes a decline in the heat resistance.

The metal fluoride and the phosphate themselves do not exhibit the lubricating properties, but if they are compounded with graphite by a slight 0.2% by weight or thereabout, various effects appear in that it is possible to prevent a change in the coefficient of friction with respect to the temperature, promote the formation of a graphite film, and increase the durability of the film under the dry frictional conditions. If the metal fluoride and the phosphate are compounded in excess of 1% by weight, the amount of the graphite film being transferred onto the mating member increases, and a disadvantage appears in the lubricating properties to an adverse effect. Accordingly, the amounts of compounding of the metal fluoride and the phosphate are preferably in the proportion of from 0.2 to 1% by weight, respectively. The metal fluoride and the phosphate may be respectively compounded with the composition separately or at the same time. The metal fluoride is selected from the group consisting of lithium fluoride, sodium fluoride, potassium fluoride, and calcium fluoride, while the phosphate is selected from the group consisting of calcium phosphate, lithium phosphate, and calcium pyrophosphate.

Next, a description will be given of the sliding member and the spherical annular seal member in accordance with the present invention. The sliding member and the spherical annular seal member are each formed by filling the above-described composition into a mold having a desired configuration and by subjecting the composition to compression molding. Further, if each of the sliding member and the spherical annular seal member is sintered in the atmosphere or a non-oxidating atmosphere at 550 to 900° C. for 5 to 60 minutes after the molding, the sliding member and the spherical annular seal member having higher strength can be obtained. This is because the borosilicate glass becomes fused and binds the particles of other substances. Accordingly, in a case where the sliding member and the spherical annular seal member are required to be provided with high strength, it is preferable to subject the sliding member and the spherical annular seal member to sintering after the molding.

The sliding member and the spherical annular seal member can be impregnated with 1 to 3% by weight of a lubricating oil by subjecting the sliding member and the spherical annular seal member to oil-impregnating treatment after the molding or sintering. Particularly in the case of the spherical annular seal member, the effect of preventing the generation of abnormal frictional noise during an early period of friction can be demonstrated by virtue of the impregnation with oil. In addition, instead of the impregnation with the lubricating oil, if a sliding layer formed of a solid lubricant of at least one kind selected from the group consisting of boron nitride, graphite, and polytetrafluoroethylene is formed on the surface of each of the sliding member and the spherical annular seal member, it is possible to obtain an effect similar to that derived from impregnation with oil.

The composition for a sliding member as well as the sliding member and the spherical annular seal member formed of that composition in accordance with the present invention excel in frictional wear characteristics, do not generate abnormal noise, and are suitable for use under dry frictional conditions over a wide temperature range from the normal temperature to 600° C.

Hereafter, a more detailed description will be given of examples of the present invention by referring to the accompanying drawings. It should be noted that the present invention is not limited to these examples.

BRIEF DESCRIPTION OF THE DRAWINGS

FIG. 6 is a diagram, partly in section, of a test apparatus (a spherical joint of an exhaust pipe).

EXAMPLES

Examples 1 to 6

Figure 1:
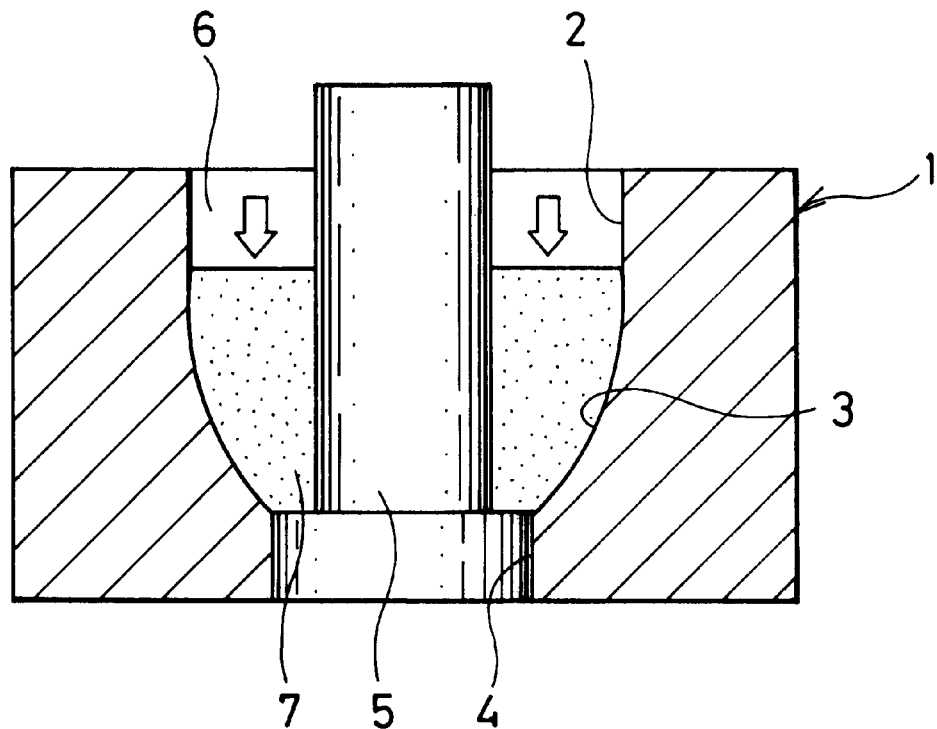
FIG. 1 is a cross-sectional view illustrating a mold for fabricating a spherical annular seal member.

From 50 to 60 parts by weight of steel fibers having a diameter of 35 μm and a length of 0.5 mm, from 5 to 10 parts by weight of a borosilicate glass powder, 14 parts by weight of a 14% alcohol solution of a phenolic resin, and a balance of 28 to 43 parts by weight of a graphite powder were charged into a mixer and mixed, and the mixture was granulated. Thus, examples of the composition for a sliding member which were composed of from 50 to 60% by weight of the steel fibers, from 5 to 10% by weight of the borosilicate glass, 2% by weight of the phenolic resin, and a balance of graphite were thereby prepared. This composition was loaded in a mold, and was press-formed under a molding pressure of 3 tons/cm$^2$, thereby obtaining square sliding members each having a side of 20 mm and a thickness of 5 mm. The examples of the composition of components of the sliding member thus obtained are shown in Table 1.

TABLE 1

| Example | 1 | 2 | 3 | 4 | 5 | 6 |
|---|---|---|---|---|---|---|
| Steel fiber | 50 | 50 | 50 | 60 | 60 | 60 |
| Borosilicate glass | 5 | 7 | 10 | 5 | 7 | 10 |
| Phenolic resin | 2 | 2 | 2 | 2 | 2 | 2 |
| Graphite | 43 | 41 | 38 | 33 | 31 | 28 |
| Friction coefficient | 0.20 | 0.16 | 0.18 | 0.22 | 0.18 | 0.19 |
| Amount of wear (mm) | 0.013 | 0.007 | 0.010 | 0.015 | 0.009 | 0.012 |

Examples 7 to 12

60 parts by weight of steel fibers having a diameter of 35 μm and a length of 0.5 mm, from 7 to 10 parts by weight of a borosilicate glass powder, 14 parts by weight of a 14% alcohol solution of a phenolic resin, 0.6 part by weight of a metal fluoride (sodium fluoride) and/or 0.6 part by weight of a phosphate (lithium phosphate), and a balance of from 26.8 to 30.4 parts by weight of a graphite powder were charged into the mixer and mixed, and the mixture was granulated. Thus, examples of the composition for a sliding member which were composed of 60% by weight of the steel fibers, from 7 to 10% by weight of the borosilicate glass, 2% by weight of the phenolic resin, 0.6% by weight of the metal fluoride and/or 0.6% by weight of the phosphate (lithium phosphate), and a balance of graphite were thereby prepared. This composition was loaded in the mold, and was press-formed under a molding pressure of 3 tons/cm$^2$, thereby obtaining square sliding members each having a side of 20 mm and a thickness of 5 mm. The examples of the composition of components of the sliding member thus obtained are shown in Table 2.

TABLE 2

| Example | 7 | 8 | 9 | 10 | 11 | 12 |
|---|---|---|---|---|---|---|
| Steel fiber | 60 | 60 | 60 | 60 | 60 | 60 |
| Borosilicate glass | 7 | 10 | 7 | 10 | 7 | 10 |
| Phenolic resin | 2 | 2 | 2 | 2 | 2 | 2 |

TABLE 2-continued

| Example | 7 | 8 | 9 | 10 | 11 | 12 |
|---|---|---|---|---|---|---|
| Graphite | 30.4 | 27.4 | 30.4 | 27.4 | 29.8 | 26.8 |
| Metal fluoride | 0.6 | 0.6 | — | — | 0.6 | 0.6 |
| Phosphate | — | — | 0.6 | 0.6 | 0.6 | 0.6 |
| Friction coefficient | 0.15 | 0.17 | 0.17 | 0.18 | 0.16 | 0.17 |
| Amount of wear (mm) | 0.008 | 0.010 | 0.011 | 0.013 | 0.009 | 0.010 |

The friction coefficient and the amount of wear in Tables 1 and 2 are the results of tests which were conducted under the following conditions. The friction coefficient is shown by a value after the lapse of one hour subsequent to the start of the test, while the amount of wear is shown by value after the lapse of 20 hours subsequent to the start of the test.

Test Conditions

Load: 5 kgf/cm$^2$ Sliding speed: 12 m/min

Atmospheric temperature: 600° C.

Mating material: SUS 304

Test: thrust test

Examples 13 to 16

The sliding members of the above-described Examples 5, 7, 9, and 11 were loaded in a siliconit furnace and were subjected to heat treatment in a nitrogen atmosphere for 15 minutes at 670° C., thereby obtaining sintered sliding members. A thrust test similar to the one described above was conducted on the sliding members, and the results of measurement of the friction coefficient and the amount of wear are shown in Table 3.

TABLE 3

| Example | Treatment | Friction Coefficient | Amount of Wear (mm) |
|---|---|---|---|
| 13 | The sliding member of Example 5 was sintered. | 0.19 | 0.009 |
| 14 | The sliding member of Example 7 was sintered. | 0.17 | 0.008 |
| 15 | The sliding member of Example 9 was sintered. | 0.19 | 0.012 |
| 16 | The sliding member of Example 11 was sintered. | 0.18 | 0.010 |

Examples 17 to 22

The sliding members of the above-described Examples 2, 5, 7, 9, 14, and 15 were immersed in a constant temperature batch in which lubricating oil (engine oil) was stored, and the lubricating oil was heated from normal temperature to 80° C. to effect oil impregnating treatment, thereby obtaining sliding members containing 3% by weight of the lubricating oil. A thrust test similar to the one described above was conducted on the sliding members, and the results of measurement of the friction coefficient and the amount of wear shown in Table 4.

TABLE 4

| Example | Treatment | Friction Coefficient | Amount of Wear (mm) |
|---|---|---|---|
| 17 | The sliding member of Example 2 was impregnated with oil. | 0.13 | 0.006 |
| 18 | The sliding member of Example 5 was impregnated with oil. | 0.12 | 0.005 |
| 19 | The sliding member of Example 7 was impregnated with oil. | 0.12 | 0.005 |
| 20 | The sliding member of Example 9 was impregnated with oil. | 0.12 | 0.007 |
| 21 | The sliding member of Example 14 was impregnated with oil. | 0.12 | 0.005 |
| 22 | The sliding member of Example 15 was impregnated with oil. | 0.12 | 0.008 |

Examples 23 to 28

An aqueous dispersion (containing 17% by weight of boron nitride, 3% by weight of alumina, 10% by weight of polytetrafluoroethylene, and 70% by weight of water), in which 30% by weight of a lubricating composition of 56.7% by weight of a boron nitride powder having an average particle size of 7 μm, 10% by weight of an alumina powder having an average particle size of 0.6 μm, and 33.3% by weight of polytetrafluoroethylene having an average particle size of 0.3 μm was contained in dispersed form as solid matter, was prepared. Sliding surfaces of the sliding members of the above-described Examples 2, 5, 7, 9, 14, and 15 were coated with the aqueous dispersion by means of application thereof, and were then allowed to dry, thereby obtaining sliding members on each of which a solid lubricant sliding layer of 56.7% by weight of boron nitride, 10% by weight of alumina, and 33.3% by weight of polytetrafluoroethylene was formed on the respective sliding surface. A thrust test similar to the one described above was conducted on the sliding members, and the results of measurement of the friction coefficient and the amount of wear are shown in Table 5.

TABLE 5

| Example | Treatment | Friction Coefficient | Amount of Wear (mm) |
|---|---|---|---|
| 23 | A solid lubricant sliding layer was formed on the sliding member of Example 2. | 0.15 | 0.007 |
| 24 | A solid lubricant sliding layer was formed on the sliding member of Example 5. | 0.15 | 0.007 |
| 25 | A solid lubricant sliding layer was formed on the sliding member of Example 7. | 0.14 | 0.007 |
| 26 | A solid lubricant sliding layer was formed on the sliding member of Example 9. | 0.15 | 0.009 |
| 27 | A solid lubricant sliding layer was formed on the sliding member of Example 14. | 0.16 | 0.008 |
| 28 | A solid lubricant sliding layer was formed on the sliding member of Example 15. | 0.17 | 0.009 |

Example 29

62 parts by weight of steel fibers having a diameter of 35 μm and a length of 0.5 mm, 7 parts by weight of a borosilicate glass powder, 14 parts by weight of a 14% alcohol solution of a phenolic resin, 0.6 part by weight of a metal fluoride (calcium fluoride), and a balance of 28.4 parts by weight of a graphite powder were charged into the mixer and mixed, and the mixture was granulated. Thus, a composition for a sliding member which was composed of 62% by weight of the steel fibers, 7% by weight of the borosilicate glass, 2% by weight of the phenolic resin, 0.6% by weight of the metal fluoride and a balance of graphite was thereby prepared. This composition was loaded in the mold, and was press-formed under a molding pressure of 3 tons/cm$^2$, thereby obtaining a hollow cylindrical test piece having an inside diameter of 10 mm, an outside diameter of 16 mm, and a length of 9 mm.

Example 30

The test piece of Example 29 was subjected to heat treatment similar to that in Example 13, and a sintered hollow cylindrical test piece was obtained.

Examples 31 and 32

The test pieces of Examples 29 and 30 were subjected to oil impregnating treatment similar to that in Example 17, and hollow cylindrical test pieces impregnated with lubricating oil were obtained.

The radial crushing strength of the hollow cylindrical test pieces of Examples 29 to 32 was measured. The measurement was carried out in accordance with JIS Z 2507. The results are shown in Table 6.

TABLE 6

| Example | Treatment | Radial crushing strength (kg/mm$^2$) |
|---|---|---|
| 29 | — | 1.1 |
| 30 | The test piece of Example 29 was sintered. | 1.9 |
| 31 | The test piece of Example 29 was impregnated with oil. | 0.7 |
| 32 | The test piece of Example 30 was impregnated with oil. | 1.9 |

Example 33

Figure 2:
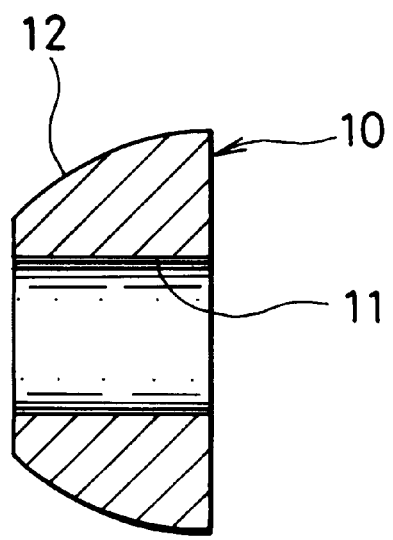
FIG. 2 is a cross-sectional view illustrating the spherical annular seal member.

57 parts by weight of steel wool chops having a diameter of 100 μm and a length of 2 mm, 7 parts by weight of a borosilicate glass powder, 14 parts by weight of a 14% alcohol solution of a phenolic resin, 0.6 part by weight of a metal fluoride (sodium fluoride), and a balance of a graphite powder (33.4 parts by weight) were charged into the and mixed, and the mixture was granulated. Thus, a composition for a sliding member which was composed of 57% by weight of the steel wool chops, 7% by weight of the borosilicate glass, 2% by weight of the phenolic resin, 0.6% by weight of the metal fluoride and a balance of graphite was thereby prepared. Next, a metal mold 1 (FIG. 1) was prepared which had as its inner surface portions a cylindrical wall surface 2, a partially concave spherical wall surface 3 continuing to an end of the cylindrical wall surface 2, and a through hole 4 continuing to the partially concave spherical wall surface 3, a stepped core 5 being fitted in the through hole 4 so as to form inside the mold 1 a hollow cylindrical portion 6 and a hollow spherical annular portion 7 continuing to the hollow cylindrical portion 6. After the aforementioned composition was filled in the hollow spherical annular portion 7 and the hollow cylindrical portion 6 of the mold 1, the composition was compression molded under a molding pressure of 3 tons/cm$^2$. After the compression molding, the molded piece was removed from the mold 1, thereby obtaining a spherical annular seal member 10 (FIG. 2) having a through hole 11 defining its inner surface and a partially convex spherical surface portion 12 on its outer surface.

Example 34

Figure 3:
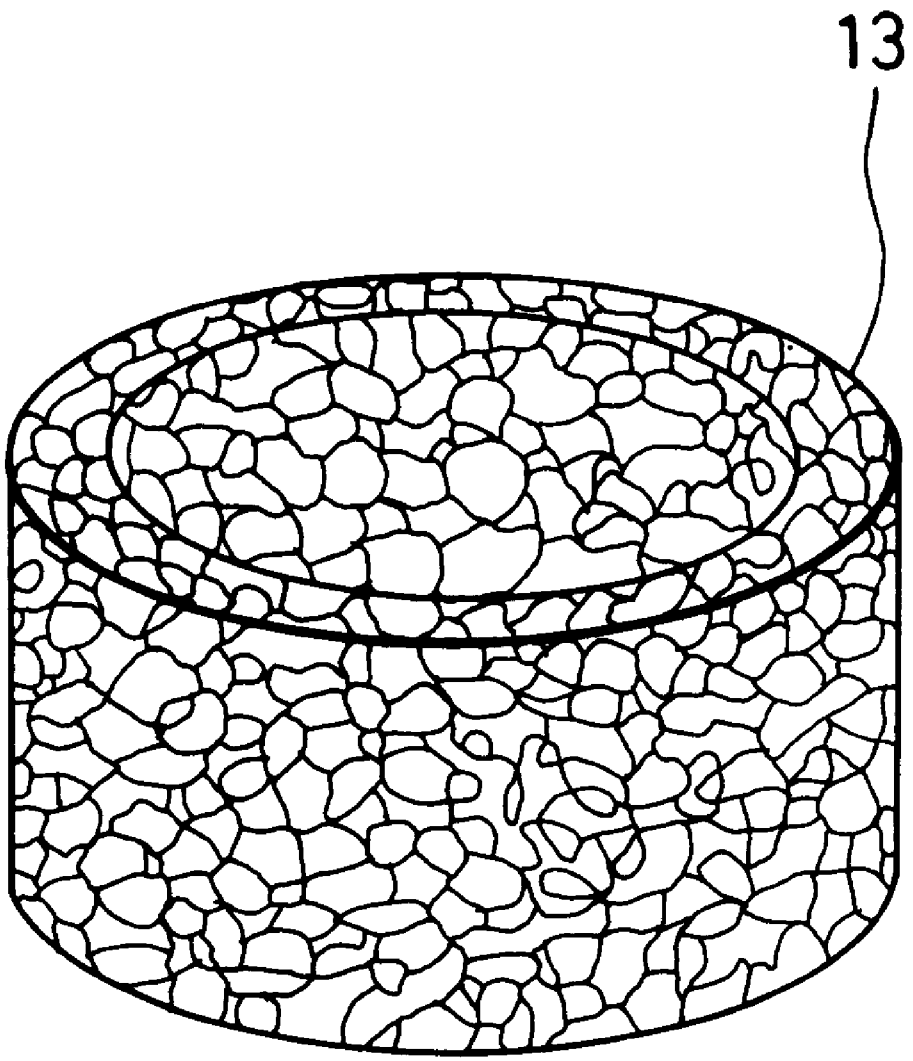
FIG. 3 is a perspective view illustrating a hollow cylindrical reinforcing member.
Figure 4:
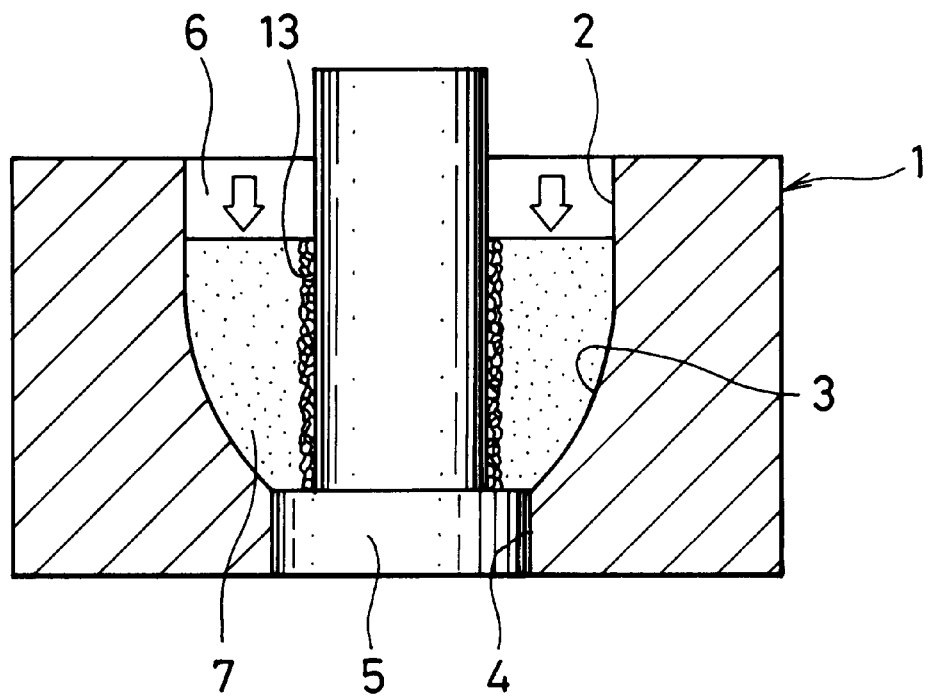
FIG. 4 is a cross-sectional view illustrating the mold for fabricating the spherical annular seal member.
Figure 5:
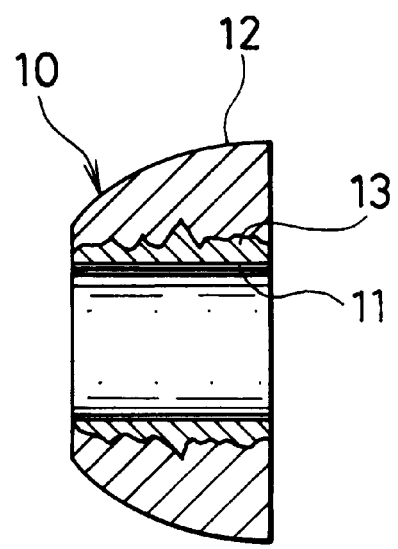
FIG. 5 is a cross-sectional view illustrating the spherical annular seal member.

A bag-shaped woven mesh having 5 mm-mesh openings was prepared by using stainless steel wires having a 0.3 mm diameter. After the bag-shaped woven mesh was passed between rollers so as to be shaped into the form of a sheet, and was then wound by two turns into a hollow cylindrical shape, thereby forming a hollow cylindrical reinforcing member 13 (FIG. 3) formed of the bag-shaped woven mesh. The hollow cylindrical reinforcing member 13 was fitted over an outer peripheral surface of the stepped core 5, and the core 5 was inserted in the through hole 4 of the mold 1, and the hollow cylindrical reinforcing member 13 was caused to be positioned in the hollow spherical annular portion 7 of the mold 1. Then, after a composition similar to that of the above-described Example 33 was filled in the hollow spherical annular portion 7 and the hollow cylindrical portion 6 of the mold 1, the composition was compression molded under a molding pressure of 3 tons/cm$^2$ (FIG. 4). After the compression molding, the molded piece was removed from the mold 1, thereby obtaining a spherical annular seal member 10 (FIG. 5) having the through hole 11 defining its inner surface and the partially convex spherical surface portion 12 on its outer surface and integrally having the hollow cylindrical reinforcing member 13 on the through hole 11 side such that the composition and the hollow cylindrical reinforcing member 13 are made structurally integral.

Example 35

The spherical annular seal member obtained in the above-described Example 33 was immersed in a constant temperature bath in which lubricating oil (engine oil) was stored, and the lubricating oil was heated from normal temperature to 80° C. to effect oil impregnating treatment, thereby obtaining an oil-impregnated spherical annular seal member containing 3% by weight of the lubricating oil.

Example 36

An aqueous dispersion (containing 17% by weight of boron nitride, 3% by weight of alumina, 10% by weight of polytetrafluoroethylene, and 70% by weight of water), in which 30% by weight of a lubricating composition of 56.7% by weight of a boron nitride powder having an average particle size of 7 μm, 10% by weight of an alumina powder having an average particle size of 0.6 μm, and 33.3% by weight of polytetrafluoroethylene having an average particle size of 0.3 μm was contained in dispersed form as solid matter, was prepared. The surface of the partially convex spherical surface portion of the spherical annular seal member obtained in the above-described Example 33 was coated with the aqueous dispersion by means of application thereof, and was then allowed to dry, thereby obtaining a spherical annular seal member which had the through hole defining its inner surface and the partially convex spherical surface portion on its outer surface, and on which a solid lubricant sliding layer of 56.7% by weight of boron nitride, 10% by weight of alumina, and 33.3% by weight of polytetrafluoroethylene was formed on the surface of the partially convex spherical surface portion.

A description will be given of the results of a test which was conducted on the spherical annular seal members obtained in the above-described Examples 33, 34, 35, and 36 with respect to the swinging torque (kgf-cm), the hermetically sealing function (the amount of gas leakage l (litter)/min), and the presence or absence of the generation of abnormal noise.

Test Apparatus

The spherical annular seal member was attached to an end of a pipe, and the spherical annular seal member was brought into sliding contact with a concave spherical surface portion provided on an end of another pipe under the conditions given below, and a test was conducted on the swinging torque at the joint portion, the amount of gas leakage from the joint portion, and the generation of abnormal noise. The test apparatus (in a state in which the spherical annular seal member was fitted in a spherical joint) is shown in FIG. 6. In FIG. 6, a flange 200 is provided uprightly around an outer peripheral surface of an upstream-side exhaust pipe 100 connected to an end of an engine by leaving a pipe end 101, the pipe end 101 is fitted in the through hole 11 of the spherical annular seal member 10, and a large-diameter side end face of the partially convex spherical surface portion 12 is made to abut against the flange 200 and is seated thereon. A downstream-side exhaust pipe 300, which is connected to a muffler end, faces the upstream-side exhaust pipe 100, and an enlarged-diameter portion 301 having a concave spherical surface portion 302 at its end portion and a flange 303 around a peripheral edge of the opening of the concave spherical surface portion 302 is formed integrally with the downstream-side exhaust pipe 300. The downstream-side exhaust pipe 300 is disposed with the concave spherical surface portion 302 held in sliding contact with the partially convex spherical surface portion 12 of the spherical annular seal member 10. The downstream-side exhaust pipe 300 is constantly urged toward the upstream-side exhaust pipe 100 by spring forces by means of a pair of bolts 400 each having one end fixed to the flange 200 and the other end inserted in the flange 303 of the enlarged-diameter portion 301 as well as a pair of coil springs 500 each loaded over the bolt 400 in such a manner as to lie between the head of the bolt 400 and the flange 303.

Test Conditions

Pressing force using the coil springs: 60 kgf

Swinging angle: ±3°

Frequency: 12 Hertz

Atmospheric temperature (temperature at the outer surface of the concave spherical portion shown in FIG. 6): room temperature to 600° C.

Test Method

At room temperature, the test pieces were subjected to 45,000 swinging motions at the frequency of 12 Hertz and at the swinging angle of ±3°, and the atmospheric temperature was then raised to 600° C. while continuing the swinging motions (45,000 swinging motions during the temperature rise). After the atmospheric temperature reached 600° C., the test pieces were subjected to 115,000 swinging motions, and the atmospheric temperature was lowered to room temperature while continuing the swinging motions (45,000 swinging motions during the temperature drop). A total of these 250,000 swinging motions were set as one cycle, and four cycles were carried out.

Test Method on Gas Leakage

Air was supplied under a pressure of 0.5 kgf/cm$^2$ from the upstream-side exhaust pipe 100 side of the test apparatus (spherical joint) shown in FIG. 6, and the amount of gas leakage (l(liter)/min) per minute was measured at the position of the spherical joint.

Evaluation of Abnormal Noise

The evaluation of the presence or absence of the generation of abnormal noise at the position of the spherical joint was measured under the following criteria:

Evaluation code I: Only usual frictional noise was heard, and no abnormal noise was generated.

Evaluation code II: In addition to the frictional noise, slight abnormal noise was heard in a state in which a test personnel's ear was brought close to the test piece.

Evaluation code III: At a fixed position (at a position 1.5-m away from the test piece), the abnormal noise was muffled by the living environment noise and was generally difficult to perceive, but the noise could be determined to be abnormal noise by the test personnel.

Evaluation code IV: The noise could be discriminated by anyone as being abnormal noise (unpleasant noise) even from the fixed position.

Table 7 shows the results of the above-described test.

TABLE 7

|   |   | Example 33 | Example 34 | Example 35 | Example 36 |
|---|---|---|---|---|---|
| 1 | Swinging torque (kgf-cm) | 100 | 90 | 80 | 85 |
|   | Amount of gas leakage (l/min) | 0.2 | 0.2 | 0.2 | 0.2 |
|   | Determination of abnormal noise | II | II | I | I |
| 2 | Swinging torque (kgf-cm) | 120 | 100 | 100 | 100 |
|   | Amount of gas leakage (l/min) | 0.4 | 0.3 | 0.4 | 0.4 |
|   | Determination of abnormal noise | I | I | I | I |
| 3 | Swinging torque (kgf-cm) | 120 | 110 | 110 | 110 |
|   | Amount of gas leakage (l/min) | 0.7 | 0.5 | 0.5 | 0.5 |
|   | Determination of abnormal noise | I | I | I | I |
| 4 | Swinging torque (kgf-cm) | 130 | 110 | 120 | 120 |
|   | Amount of gas leakage (l/min) | 0.7 | 0.7 | 0.7 | 0.7 |
|   | Determination of abnormal noise | I | I | I | I |

In Table 7, item 1 shows the results of from 0 to 250,000 swinging motions; item 2 shows the results of from 250,000 to 500,000 swinging motions; item 3 shows the results of from 500,000 to 750,000 swinging motions; and item 4 shows the results of from 750,000 to 1,000,000 swinging motions. From these test results, it was confirmed that, as for the spherical annular seal members of Examples 33, 34, 35, and 36, a graphite film of the composition was respectively formed as a thin film on the surface of the mating member (concave spherical surface portion) after the test. The fact that the graphite film was formed on the mating member means that close sliding contact was carried out between the spherical annular seal member and the mating member, that the amount of gas leakage from the position of the joint was very small, and that the effect appeared in the prevention of the generation of the abnormal noise. This satisfies the conditions required for the seal member for a spherical joint of an automobile exhaust pipe.

Example 37

62 parts by weight of steel fibers having a diameter of 35 μm and a length of 0.5 mm, 7 parts by weight of a borosilicate glass powder, 14 parts by weight of a 14% alcohol solution of a phenolic resin, 0.6 part by weight of a metal fluoride (calcium fluoride), and a balance of 28.4 parts by weight of a graphite powder were charged into the mixer and mixed, and the mixture was granulated. Thus, a composition for a sliding member which was composed of 62% by weight of the steel fibers, 7% by weight of the borosilicate glass, 2% by weight of the phenolic resin, 0.6 % by weight of the metal fluoride and a balance of graphite was thereby prepared. Next, a spherical annular seal member having a through hole defining its inner surface and a partially convex spherical surface portion on its outer surface was obtained by a method similar to that of Example 33. The seal member was loaded in the siliconit furnace and was subjected to heat treatment in a nitrogen atmosphere for 17 minutes at 670° C., thereby obtaining a sintered spherical annular seal member.

Example 38

By using a composition similar to that of the above-described Example 37 as the composition for a sliding member and by a method similar to that of Example 34, a spherical annular seal member was obtained which had the through hole defining its inner surface and the partially convex spherical surface portion on its outer surface and which integrally had the hollow cylindrical reinforcing member on the through hole side such that the composition and the hollow cylindrical reinforcing member were made structurally integral. The seal member was subjected to heat treatment similar to that in the above-described Example 37, thereby obtaining a sintered spherical annular seal member.

Example 39

The spherical annular seal member obtained in the above-described Example 37 was immersed in a constant temperature bath in which lubricating oil (engine oil) was stored, and the lubricating oil was heated from normal temperature to 80° C. to effect oil impregnating treatment, thereby obtaining an oil-impregnated spherical annular seal member containing 3% by weight of the lubricating oil.

Example 40

The surface of the partially convex spherical surface portion of the spherical annular seal member obtained in the above-described Example 37 was coated with the aqueous dispersion similar to that of Example 36 by means of application thereof, and was then allowed to dry, thereby obtaining a spherical annular seal member which had the through hole defining its inner surface and the partially convex spherical surface portion on its outer surface, and on which a solid lubricant sliding layer of 56.7% by weight of boron nitride, 10% by weight of alumina, and 33.3% by weight of polytetrafluoroethylene was formed on the surface of the partially convex spherical surface portion.

By using the above-described test method, a test was conducted on the spherical annular seal members obtained in the above-described Examples 37, 38, 39, and 40 with respect to the swinging torque (kgf-cm), the hermetically sealing function (the amount of gas leakage l (litter)/min), and the presence or absence of the generation of abnormal noise. The results are shown in Table 8.

TABLE 8

|   | | Example 37 | Example 38 | Example 39 | Example 40 |
|---|---|---|---|---|---|
| 1 | Swinging torque (kgf-cm) | 90 | 90 | 80 | 85 |
|   | Amount of gas leakage (l/min) | 0.2 | 0.2 | 0.2 | 0.2 |
|   | Determination of abnormal noise | II | II | I | I |
| 2 | Swinging torque (kgf-cm) | 100 | 100 | 90 | 95 |
|   | Amount of gas leakage (l/min) | 0.3 | 0.3 | 0.3 | 0.3 |
|   | Determination of abnormal noise | I | I | I | I |
| 3 | Swinging torque (kgf-cm) | 110 | 100 | 95 | 100 |
|   | Amount of gas leakage (l/min) | 0.5 | 0.4 | 0.4 | 0.4 |
|   | Determination of abnormal noise | I | I | I | I |
| 4 | Swinging torque (kgf-cm) | 120 | 100 | 100 | 110 |
|   | Amount of gas leakage (l/min) | 0.5 | 0.4 | 0.4 | 0.5 |
|   | Determination of abnormal noise | I | I | I | I |

In Table 8, item 1 shows the results of from 0 to 250,000 swinging motions; item 2 shows the results of from 250,000 to 500,000 swinging motions; item 3 shows the results of from 500,000 to 750,000 swinging motions; and item 4 shows the results of from 750,000 to 1,000,000 swinging motions. From these test results, it is apparent that the spherical annular seal members of Examples 37, 38, 39, and 40 are stable with low swinging torque, exhibit small amounts of gas leakage, and are free of generation of abnormal noise, and that they satisfy the conditions required for the seal member for a spherical joint of an automobile exhaust pipe.

What is claimed is:

1. A spherical annular seal member for sealing a joint portion between exhaust pipes of a vehicle, said spherical annular seal member having a through hole in a central portion thereof and a partially convex spherical surface portion on an outer surface thereof, said spherical annular seal member formed by compression molding a mixture consisting essentially of from 40 to 80% by weight of steel fibers or wool chops, from 3 to 20% by weight of a borosilicate glass powder, and from 15 to 50% by weight of a graphite powder, wherein the glass powder contains boron trioxide ($B_2O_3$) in a portion of 40 to 70% by weight of the glass powder.

2. A spherical annular seal member according to claim 1 which is sintered after the compression molding.

3. A spherical annular seal member for sealing a joint portion between exhaust pipes of a vehicle, said spherical annular seal member having a through hole in a central portion thereof and a partially convex spherical surface portion on an outer surface thereof, said spherical annular seal member comprising: a hollow cylindrical reinforcing member constituted by a metal mesh wound into a hollow cylindrical shape; and a mixture consisting essentially of from 40 to 80% by weight of steel fibers or wool chops, from 3 to 20% by weight of a borosilicate glass powder, and from 15 to 50% by weight of a graphite powder, wherein the glass powder contains boron trioxide ($B_2O_3$) in a proportion of 40 to 70% by weight of the glass powder and wherein said mixture fills the mesh openings of said hollow cylindrical reinforcing member and covers said hollow cylindrical reinforcing member, said hollow cylindrical reinforcing member and said mixture being formed structurally integrally by being compression molded.

4. A spherical annular seal member according to claim 3 which is sintered after being formed structurally integrally by the compression molding.

5. A spherical annular seal member according to claim 1, wherein a phenolic resin powder is contained in a proportion of from 0.3 to 2% by weight.

6. A spherical annular seal member according to claim 1, wherein a metal fluoride powder is contained in a proportion of from 0.2 to 1% by weight.

7. A spherical annular seal member according to claim 6, wherein the metal fluoride is selected from the group consisting of lithium fluoride, sodium fluoride, potassium fluoride, and calcium fluoride.

8. A spherical annular seal member according to claim 1, wherein a phosphate powder is contained in a proportion of from 0.2 to 1% by weight.

9. A spherical annular seal member according to claim 9, wherein the phosphate is selected from the group consisting of calcium phosphate, lithium phosphate, and calcium pyrophosphate.

10. A spherical annular seal member according to claim 1, wherein a lubricating oil is contained in a proportion of from 1 to 3% by weight.

11. A spherical annular seal member according to any one of claims 1 to 8 further having a sliding layer formed of a solid lubricant on the partially convex spherical surface portion.

12. A spherical annular seal member according to claim 11, wherein the solid lubricant is of at least one member selected from the group consisting of boron nitride, graphite, and polytetrafluoroethylene.

* * * * *

UNITED STATES PATENT AND TRADEMARK OFFICE

CERTIFICATE OF CORRECTION

PATENT NO.   : 5,909,881
DATED        : June 8, 1999
INVENTOR(S)  : SEGAWA

It is certified that error appears in the above-identified patent and that said letters patent is hereby corrected as shown below:

Column 13, line 50, delete "portion" and insert --proportion--. Column 14, line 37, delete "claim 9" and insert --claim 8--; line 45, delete "claims 1 to 8" and insert --claims 1 to 9--.

Signed and Sealed this

Fifteenth Day of August, 2000

*Attest:*

Q. TODD DICKINSON

*Attesting Officer*   *Director of Patents and Trademarks*